(12) United States Patent
Wan et al.

(10) Patent No.: US 9,893,607 B1
(45) Date of Patent: Feb. 13, 2018

(54) LOW DROP-OUT VOLTAGE REGULATOR AND METHOD OF STARTING SAME

(71) Applicant: NXP B.V., Eindhoven (NL)

(72) Inventors: Mingliang Wan, Shanghai (CN);
Xindong Duan, Shanghai (CN); Jian Qing, Shanghai (CN)

(73) Assignee: NXP B.V., San Jose, CA (US)

( * ) Notice: Subject to any disclaimer, the term of this patent is extended or adjusted under 35 U.S.C. 154(b) by 0 days.

(21) Appl. No.: 15/644,811

(22) Filed: Jul. 9, 2017

(30) Foreign Application Priority Data

Apr. 25, 2017  (CN) .......................... 2017 1 0280013 2

(51) Int. Cl.
*H02M 1/36* (2007.01)
*H02M 3/07* (2006.01)
*G05F 1/575* (2006.01)

(52) U.S. Cl.
CPC .............. *H02M 1/36* (2013.01); *G05F 1/575* (2013.01); *H02M 3/07* (2013.01)

(58) Field of Classification Search
CPC ............ H02M 1/36; H02M 3/07; G05F 1/575
See application file for complete search history.

(56) References Cited

U.S. PATENT DOCUMENTS

| | | | |
|---|---|---|---|
| 7,459,891 B2 | 12/2008 | Al-Shyoukh et al. | |
| 8,981,739 B2 | 3/2015 | Zhang et al. | |
| 9,018,924 B2 | 4/2015 | Vemula | |
| 9,075,422 B2 | 7/2015 | Vemula | |
| 9,379,667 B2 | 6/2016 | Khiat et al. | |
| 9,471,073 B2 | 10/2016 | Pujol et al. | |
| 2008/0122505 A1* | 5/2008 | Wu .......................... | H02M 3/07 327/157 |
| 2008/0157733 A1* | 7/2008 | Williams ................ | H02M 3/07 323/266 |
| 2011/0089916 A1* | 4/2011 | Soenen ................... | G05F 1/575 323/280 |
| 2013/0027010 A1* | 1/2013 | Groeneweg ............ | G05F 1/575 323/280 |

\* cited by examiner

*Primary Examiner* — Jue Zhang
(74) *Attorney, Agent, or Firm* — Charles E. Bergere

(57) ABSTRACT

A low drop-out voltage regulator (LDO) includes an LDO unit, a switch circuit, a charge pump, and an initiation circuit. The switch circuit is coupled to a voltage input terminal and outputs a selected input voltage. The LDO unit receives the selected input voltage from the switch circuit and generates a regulated output voltage. The charge pump is coupled to the LDO unit to receive the regulated output voltage, and generate a control signal that is provided to the switch circuit. The initiation circuit receives the input voltage and generates an initiation voltage that greater than the regulated output voltage. The initiation voltage is provided to the charge pump circuit, along with the regulated output voltage. The initiation voltage drives the charge pump circuit when the regulated output voltage is not large enough to drive the charge pump circuit.

20 Claims, 7 Drawing Sheets

US 9,893,607 B1

LOW DROP-OUT VOLTAGE REGULATOR AND METHOD OF STARTING SAME

BACKGROUND

The present invention generally relates to a low drop-out voltage regulator (LDO) and, more particularly, to an LDO with a charge pump circuit and an auxiliary startup circuit, and a method for starting the LDO.

Charge pump circuits are often used to generate a higher voltage output from a lower voltage input. A Low drop-out voltage regulator (LDO) converts and regulates an input voltage so that a receiving circuit receives an expected voltage value. For example, if a system requires a steady 5V input, a charge pump may be used to pump 3V to 6V and then a LDO is used to regulate the 6V charge pump output to provide the required 5V system input.

Systems with multiple voltage domains have become increasingly common in integrated circuits, so it is possible that a LDO will be connected to multiple supply voltages and multiple input voltages, and generate multiple regulated voltages. However, when there are multiple supply voltages, the LDO output voltage may drop to a level that is too low to drive the charge pump. Accordingly, it would be advantageous to have a LDO that can operate correctly even when its output voltage is too low to drive a charge pump.

SUMMARY

This summary is provided to introduce a selection of concepts in a simplified form that are further described below in the Detailed Description. This summary is not intended to identify key or essential features of the claimed subject matter, nor is it intended to be used to limit the scope of the claimed subject matter.

In one embodiment, the present invention provides a low drop-out voltage regulator (LDO) including an LDO unit having an input terminal and an output terminal for providing an output voltage, and a switch circuit coupled between a voltage input terminal and the input terminal of the LDO unit. The switch circuit is configured to provide an input voltage to the LDO unit. A charge pump circuit has an input terminal coupled to the output terminal of the LDO unit and an output terminal coupled to a control terminal of the switch circuit. The charge pump circuit receives the output voltage and provides a switch control signal to the switch circuit. An initiation circuit has an input terminal coupled to receive the input voltage and an output terminal coupled to the input terminal of the charge pump circuit.

In another embodiment, the present invention provides a LDO including an LDO circuit configured to provide an LDO output voltage in response to an input voltage, and a switch circuit coupled to a supply voltage. The switch circuit provides the supply voltage as the input voltage for the LDO circuit. A charge pump circuit is coupled to the switch circuit, and controls the switch circuit in response to the LDO output voltage. An initiation circuit is coupled to the charge pump circuit, and provides an auxiliary output voltage larger than the LDO output voltage to the charge pump circuit. The auxiliary output voltage drives the charge pump circuit to turn on the switch circuit.

The present invention also provides a method for starting a LDO. The method includes closing a first switch to provide an input voltage to an LDO circuit, using the LDO circuit to provide an LDO output voltage in response to the input voltage, supplying a charge pump circuit using an auxiliary voltage higher than the LDO output voltage, boosting the LDO output voltage, supplying the charge pump circuit using the LDO output voltage, and turning off the supply of the auxiliary voltage to the charge pump circuit.

BRIEF DESCRIPTION OF THE DRAWINGS

So that the manner in which the above recited features of the present invention can be understood in detail, a more detailed description of the invention may be had by reference to embodiments, some of which are illustrated in the appended drawings. The appended drawings illustrate only typical embodiments of the invention and should not limit the scope of the invention, for the invention may admit to other equally effective embodiments. The drawings are for facilitating an understanding of the invention and thus are not necessarily drawn to scale. Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
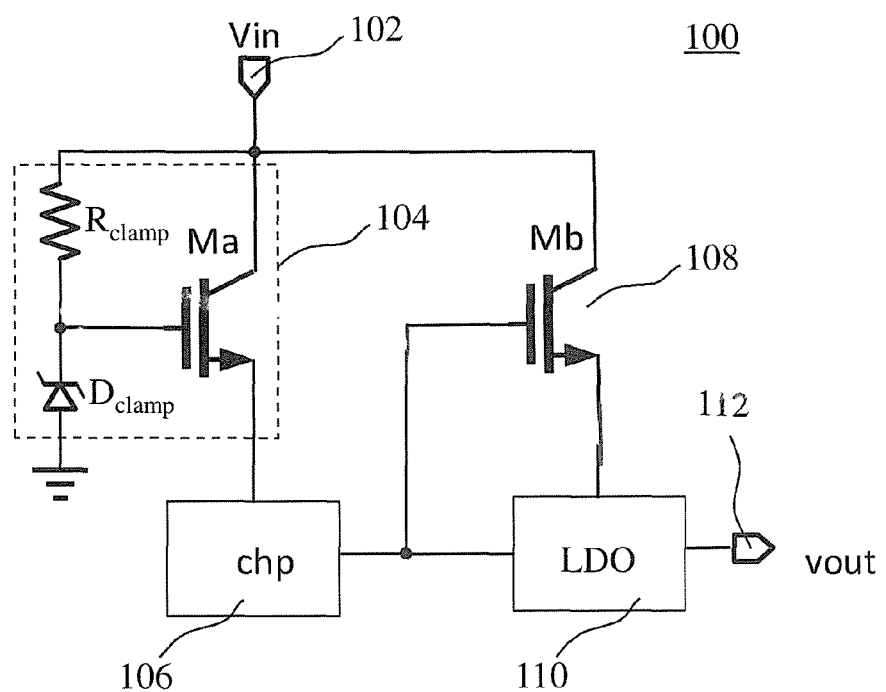
FIG. 1 is a schematic diagram of a LDO.

Referring now to FIG. 1, a schematic diagram of a low drop-out voltage regulator (LDO) 100 is shown. The LDO 100 includes a voltage input terminal 102, a clamp circuit 104, a charge pump circuit 106, a switch transistor 108, an LDO unit 110, and a voltage output terminal 112.

The voltage input terminal 102 receives an input voltage $V_{in}$ from a circuit external to the LDO 100. The input voltage terminal 102 is connected to the clamp circuit 104 and supplies the input voltage $V_{in}$ thereto. The input voltage terminal 102 also is connected to the switch transistor (Mb) 108 and supplies the input voltage $V_{in}$ thereto.

The clamp circuit 104 includes a resistor $R_{clamp}$, a Zener diode $D_{clamp}$, and a clamp transistor Ma. An anode of the Zener diode $D_{clamp}$ is coupled to ground, and a cathode of the Zener diode $D_{clamp}$ is coupled to one end of the resistor $R_{clamp}$. The other end of the resistor $R_{clamp}$ is coupled to the voltage input terminal 102. A gate terminal of the clamp transistor Ma is coupled to a node between the cathode of the Zener diode $D_{clamp}$ and the resistor $R_{clamp}$, a drain terminal of the clamp transistor Ma is coupled to the voltage input terminal 102, and a source terminal of the clamp transistor Ma is coupled to the charge pump circuit 106.

In the presence of the input voltage $V_{in}$, the clamp circuit 104 ensures a stable voltage is supplied to the charge pump circuit 106. An output of the charge pump circuit 106 is supplied to both a gate terminal of the switch transistor (Mb) 108 and the LDO unit 110. A drain terminal of the switch transistor 108 is coupled to the voltage input terminal 102, while a source terminal of the switch transistor 108 is coupled to the LDO unit 110. The switch transistor 108 is turned on by the output voltage of the charge pump circuit 106, such that the input voltage $V_{in}$ is passed to the LDO unit 110. The LDO unit 110 then generates a regulated voltage $V_{out}$, which is provided at the voltage output terminal 112.

In a situation where the input voltage $V_{in}$ fluctuates, or where the LDO 100 is supplied with multiple input voltages and during switching between the multiple input voltages, the charge pump circuit 106 may operate improperly because charge pump circuits cannot tolerate large supply voltage changes.

Figure 2:
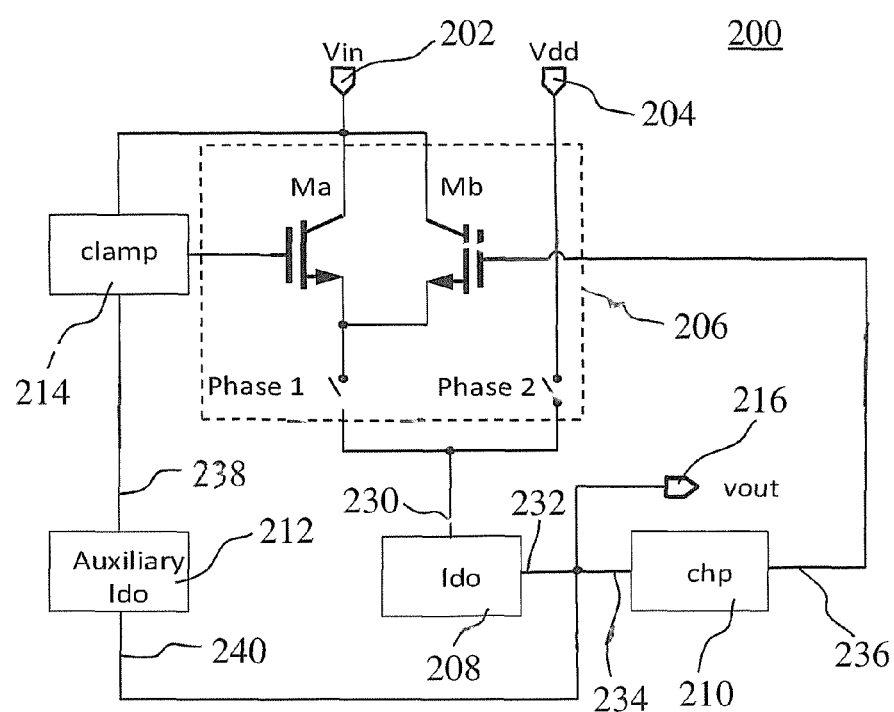
FIG. 2 is a schematic diagram of an LDO in accordance with an exemplary embodiment of the present invention.

FIG. 2 illustrates another LDO 200 in accordance with an exemplary embodiment of the present invention. The LDO 200 includes a first voltage input terminal 202 and a second voltage input terminal 204. The LDO 200 is supplied with a first input voltage $V_{in}$ or a second input voltage $V_{dd}$, respectively received on the first voltage input terminal 202 and the second voltage input terminal 204. The selection of the voltage that is input to the LDO 200, either $V_{in}$ or $V_{dd}$ is controlled by respective switches Phase 1 and Phase 2. To select the first input voltage $V_{in}$ as the input voltage for the LDO 200, the switch Phase 1 is closed and the switch Phase 2 is opened. On the other hand, to select the second input voltage $V_{dd}$ as the input voltage for the LDO 200, the switch Phase 2 is closed and the switch Phase 1 is opened.

A switch circuit 206 passes either the first or second input voltage $V_{in}$ or $V_{dd}$ to an LDO unit 208. The switch circuit 206 includes a first switch transistor $M_a$ and a second switch transistor $M_b$ coupled between the first input voltage $V_{in}$ and the LDO unit 208 by way of the switch Phase 1. Drain terminals of the first and second switch transistors $M_a$ and $M_b$ are coupled to the first voltage input terminal 202, and source terminals thereof are coupled to the LDO unit 208. Although FIG. 2 shows the second voltage input terminal 204 coupled to the LDO unit 208, in other embodiments, similar switch transistors also can be included in the switch circuit 206 for the second input voltage $V_{dd}$. The switch circuit 206 provides one of the first input voltage $V_{in}$ and the second input voltage $V_{dd}$ to the LDO unit 208.

The LDO unit 208 receives an input voltage, either the first input voltage $V_{in}$ or the second input voltage $V_{dd}$, at an input terminal 230 thereof, and generates an output voltage at an output terminal 232 thereof. A voltage output terminal 216 of the LDO 200 is coupled to the output terminal 232 and provides the LDO output voltage.

A charge pump circuit 210 is coupled to the LDO unit 208. The charge pump circuit 210 has an input terminal 234 and an output terminal 236. The input terminal 234 is coupled to the output terminal 232 of the LDO unit 208. The output terminal 236 of the charge pump circuit 210 is coupled to the switch circuit 206 and provides a switch control signal to the switch circuit 206. Preferably, the output terminal 236 is coupled to a control terminal of the switch circuit 206. In the current embodiment, the output terminal 236 is coupled to the gate terminal of the second transistor $M_b$ of the switch circuit 206.

The LDO 200 further includes a clamp circuit 214 coupled between the first voltage input terminal 202 and the switch circuit 206. Although it is shown in FIG. 2 that the clamp circuit 214 is not coupled to the second voltage input terminal 204, in other embodiments, a similar clamp circuit may be coupled to the switch transistors of the switch circuit 206 for the second input voltage $V_{dd}$. The clamp circuit 214 receives the first input voltage $V_{in}$, and provides a clamped input voltage to the switch circuit 206.

In operation, the claim circuit 214 provides a clamped input voltage to the gate terminal of the first transistor $M_a$, which ensures that the first transistor $M_a$ is switched on to pass the first input voltage $V_{in}$ to the LDO unit 208. The charge pump circuit 210 boosts the output voltage and provide a boosted voltage to the second transistor $M_b$ to turn on the second transistor $M_b$. As a result, even if the first input voltage $V_{in}$ fluctuates, or the input voltage $V_{in}$ is switched from the first input voltage $V_{in}$ to the second input voltage $V_{dd}$, the operation of the charge pump circuit 210 is not adversely effected. The operation of the charge pump circuit 210 and thus the output voltage thereof is stabilized. The LDO 200 is able to operate under a wide-ranging power supply, for example from 2.3V to 22V. Due to the fluctuation in the first input voltage $V_{in}$, the first transistor $M_a$ could be operating in a subthreshold conduction range. However, with the conduction of the second transistor $M_b$ and the boosted voltage from the charge pump circuit 210 provided to the gate of the second transistor $M_b$, the output of the switch circuit 206 is high enough to ensure the normal operation of the charge pump circuit 210.

The transistors $M_a$ and $M_b$, and the transistors included in the LDO unit 208 are preferably NMOS transistors. By between switching the input terminals 202 and 204, the supply to the LDO 200 changes rapidly from high to low or from low to high. A LDO made with PMOS transistors that have a low power supply rejection ratio might not tolerate the input change in such short intervals. The LDO 200 with NMOS transistors takes advantage of the large power supply rejection ratio (PSRR) of the NMOS transistors. Accordingly, even when the input voltage is switched to change rapidly, for example from $V_{dd}$ to $V_{in}$, the output voltage at the voltage output terminal 216 does not have much ripple. As will be discussed in more detail below, the LDO 200 further comprises an auxiliary LDO or initiation circuit 212. The initiation circuit 212 is connected between the clamp circuit 214, and a node between the LDO unit 208 output terminal 232 and the charge pump circuit 210 input terminal 234.

Figure 3:
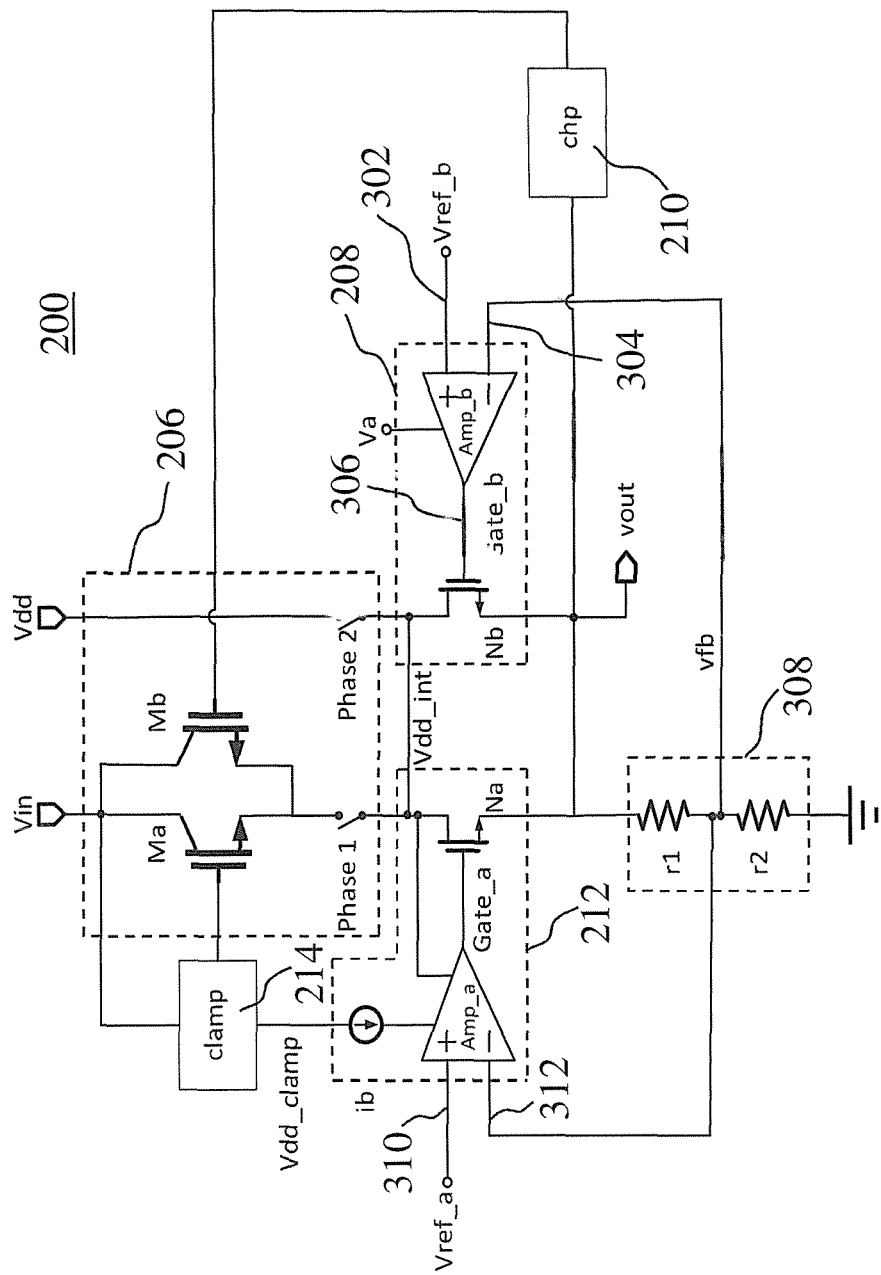
FIG. 3 is a detailed schematic diagram of the LDO of FIG. 2.

FIG. 3 is a detailed schematic circuit diagram of the LDO 200 of FIG. 2. The LDO unit 208 includes an LDO amplifier Amp_b and an LDO output transistor $N_b$. The LDO amplifier Amp_b is supplied with a first supply voltage $V_a$. In one embodiment, the LDO amplifier Amp_b is supplied with an output of the charge pump circuit 210 in low drop-out situations, for example 5V, or with the input voltage passed through the switch circuit 206. The LDO amplifier Amp_b has a non-inverting input terminal 302 and an inverting input terminal 304. The non-inverting input terminal 302 receives a first reference voltage $V_{ref\_b}$. An output terminal 306 of the LDO amplifier Amp_b is coupled to a control terminal of the LDO output transistor $N_b$ and provides a signal Gate_b to the control terminal of the LDO output transistor $N_b$. A first current electrode of the LDO output transistor $N_b$ is coupled to the switch circuit 206 (i.e., to both of the Phase 1 and Phase 2 switches), and a second current electrode of the LDO output transistor $N_b$ is coupled to the voltage output terminal 216 to provide the output voltage. In the current embodiment, the LDO unit 208 includes a feedback circuit 308 coupled between the second current electrode of the LDO output transistor $N_b$ and ground. The feedback circuit 308 provides a feedback voltage $V_{fb}$ to the inverting input terminal 304 of the LDO amplifier Amp_b. More specifically, the feedback circuit 308 includes a first resistor r1 connected in series with a second resistor r2. The feedback voltage $V_{fb}$ is provided at a node between the first and second resistors r1 and r2.

The first transistor $M_a$, the second transistor $M_b$, and the LDO output transistor $N_b$ are preferably NMOS transistors in order to take advantage of the high PSRR thereof. The first current electrode of the LDO output transistor $N_b$ is a drain terminal thereof, and the second current electrode of the LDO output transistor $N_b$ is a source terminal thereof. It can be seen from FIGS. 2 and 3 that, in order to start the charge pump circuit 210, the first input voltage $V_{in}$ should drop with gate-source voltage drops of the first transistor $M_a$ and the LDO output transistor $N_b$. In view of the two voltage drops of the NMOS transistors $M_a$ and $N_b$, the output voltage of the LDO unit 208 may not be high enough to start the charge pump circuit 210. For example, if the first input voltage $V_{in}$ is 2.5V, the voltage drops on each of the NMOS transistors $M_a$ and $N_b$ is 0.8V in the worst case, then the output voltage provided to the input terminal 234 of the charge pump circuit 210 is only 0.9V, which is too low to start the charge pump circuit 210.

Thus, in order to start the charge pump circuit 210, the LDO 200 further includes the auxiliary LDO or initiation circuit 212. The initiation circuit 212 is coupled between the clamp circuit 214 and the charge pump circuit 210. It is noted that a similar initiation circuit can also be coupled to the second voltage input terminal 204. The initiation circuit 212 has an input terminal 238 and an output terminal 240. The input terminal 238 is coupled to the first voltage input terminal 202 by way of the clamp circuit 214, and receives the clamped first input voltage $V_{in}$. The output terminal 240 is coupled to the input terminal 234 of the charge pump circuit 210.

Similar to the LDO unit 208, the initiation circuit 212 includes an amplifier Amp_a and an output transistor $N_a$. The amplifier Amp_a has a first input terminal 310 coupled to a reference voltage $V_{ref\_a}$, and a second input terminal 312 coupled to the feedback circuit 308. In the current embodiment, the first input terminal 310 is the non-inverting input terminal of the amplifier Amp_a, and the second input terminal 312 is the inverting input terminal of the amplifier Amp_a. Similar to the LDO unit 208, the node between the first and second resistors r1 and r2 is coupled to the second input terminal 312 of the amplifier Amp_a, and provides the feedback voltage $V_{fb}$ thereto. An output terminal of the amplifier Amp_a is coupled to a control terminal of the output transistor $N_a$ and provides a signal Gate_a to the control terminal of the output transistor $N_a$. The output transistor $N_a$ has a first current electrode coupled to the switch circuit 206, and a second current electrode coupled to the input terminal 234 of the charge pump circuit 210. The initiation circuit 212 further includes a first current source $i_b$ coupled between the clamp circuit 214 and the amplifier Amp_a. The amplifier Amp_a receives the clamped input voltage by way of the current source $i_b$ as the supply voltage thereof.

Figure 4:
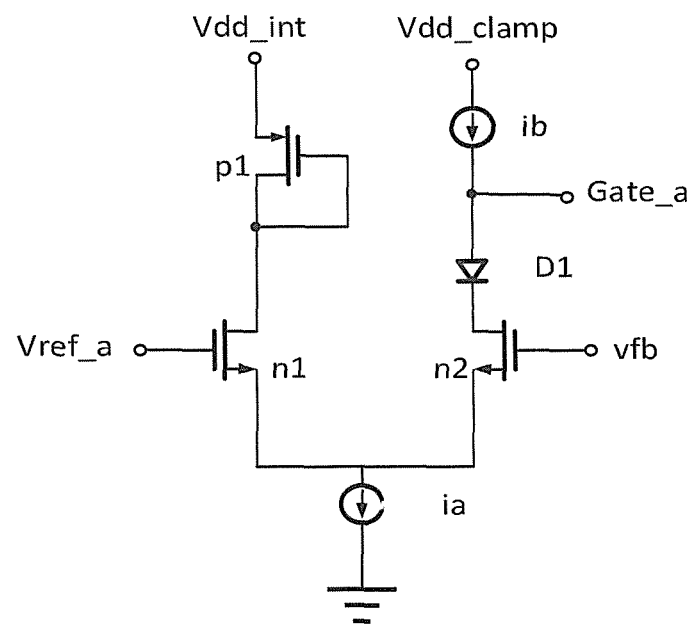
FIG. 4 is circuit diagram of the amplifier of the initiation circuit of FIGS. 2 and 3.

FIG. 4 is a circuit diagram of the amplifier Amp_a of the initiation circuit 212. The amplifier Amp_a includes a first amplifier transistor p1, a second amplifier transistor n1, and a third amplifier transistor n2. In the embodiment shown, the first amplifier transistor p1 is a PMOS transistor, while the second and third amplifier transistor n1 and n2 are NMOS transistors. A source terminal of the first amplifier transistor p1 is coupled to the switch circuit 206 and receives the input voltage $V_{dd\_int}$ output by the switch circuit 206 as the input voltage. The gate and drain terminals of the first amplifier transistor p1 are coupled together and to a drain of the second amplifier transistor n1. The gate terminal of the second amplifier transistor n1 receives the reference voltage $V_{ref\_a}$. The third amplifier transistor n2 has a gate terminal coupled to the feedback circuit 308 for receiving the feedback voltage $v_{fb}$, and a source terminal coupled to the source terminal of the second amplifier transistor n1.

The amplifier Amp_a further includes a diode D1 coupled between an output of the first current source $i_b$ and the drain terminal of the third amplifier transistor n2. An anode of the diode D1 is coupled to the first current source $i_b$, and a cathode of the diode D1 is coupled to the drain terminal of the third amplifier transistor n2. A node between the first current source $i_b$ and the diode D1 is coupled to the gate terminal of the output transistor $N_a$ and provides a gate control signal Gate_a. The diode D1 is used to prevent reverse current flow from the source terminal of the third amplifier transistor n2 to the clamp circuit 214 when the second input voltage $V_{dd}$ is selected as the power supply and the first input voltage $V_{in}$ is a zero voltage.

A second current source $i_a$ is coupled between the source terminals of the second and third amplifier transistors n1, n2 and ground. In the current embodiment, the second current source $i_a$ drives a current larger than the current driven by the first current source $i_b$.

With reference to FIGS. 3 and 4, the clamped input voltage $V_{dd\_clamp}$ is provided to the charge pump circuit 210 without passing through the transistors Ma and Mb of the switch circuit 206. Since the voltage drop is only from the output transistor $N_a$, the output of the initiation circuit 212 is higher than the output of the LDO unit 208, and is high enough to start the charge pump circuit 210.

It can be seen from FIG. 3 that the initiation circuit 212 is similar to the LDO unit 208. As discussed, the initiation circuit 212 operates in a similar way as the LDO unit 208.

Figure 5:
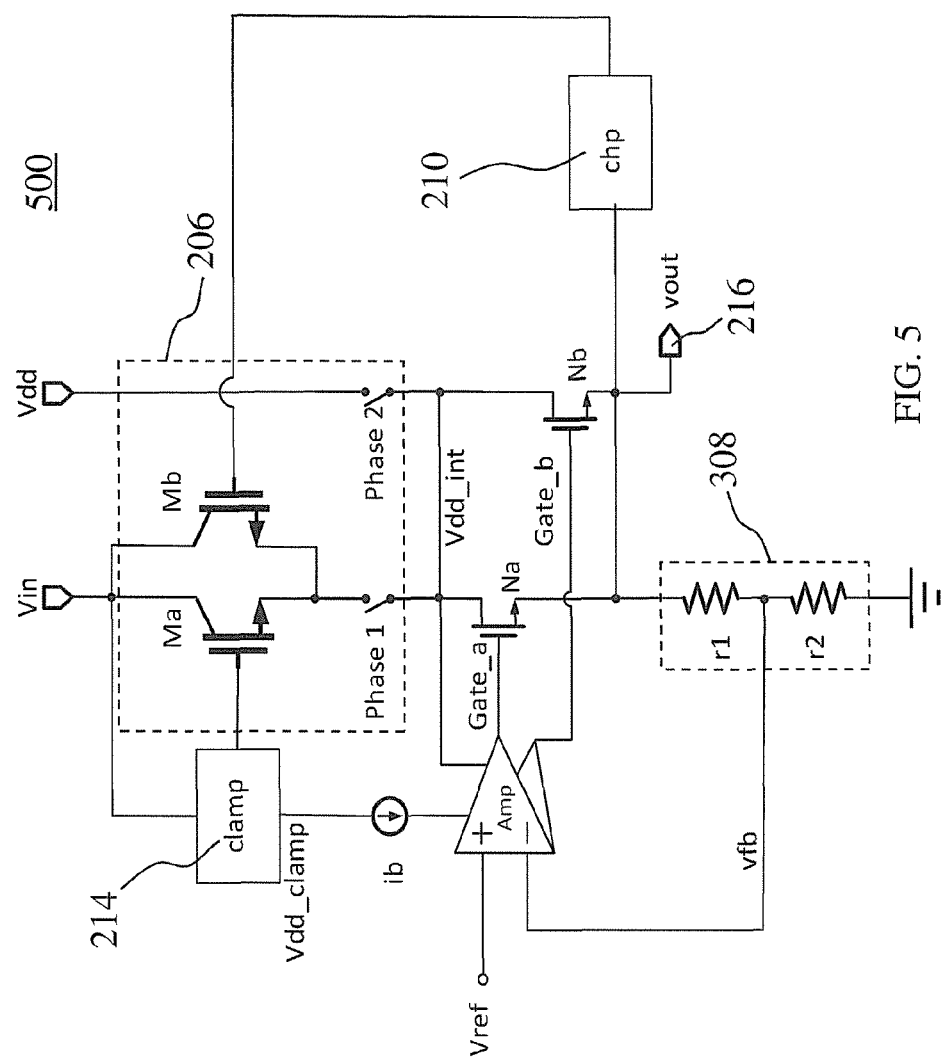
FIG. 5 is a schematic diagram of an LDO in accordance with another embodiment of the present invention.

FIG. 5 shows a LDO 500 according to an alternative embodiment of the present invention. The LDO 500 includes the switch circuit 206, the charge pump circuit 210, and the clamp circuit 214 like the LDO 200 of FIG. 2. The LDO 500 includes an amplifier Amp, which integrates the amplifier Amp_a of the initiation circuit 212 and the LDO amplifier Amp_b of the LDO unit 208 of FIG. 3. The amplifier Amp has a non-inverting input terminal that receives the reference voltage $V_{ref}$, an inverting input terminal coupled to the feedback circuit 308 for receiving the feedback voltage $v_{fb}$, and two output terminals respectively coupled to gate terminals of the output transistors $N_a$ and $N_b$ for providing the gate control signals Gate_a and Gate_b. Thus, the LDO 500 has the Amp, which functions as both the initiation circuit 212 and the LDO unit 208.

Figure 6:
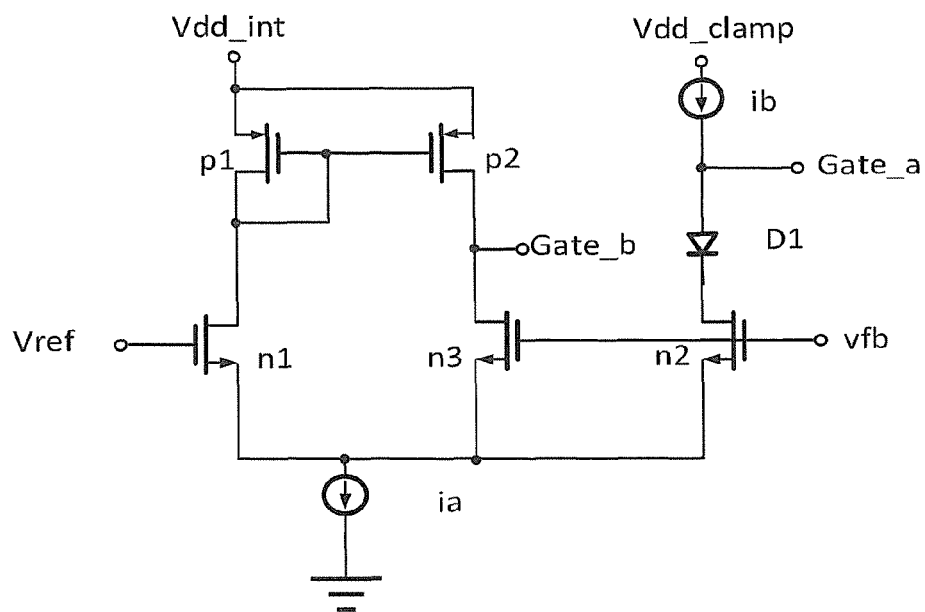
FIG. 6 is a circuit diagram of the amplifier of the LDO of FIG. 5.

FIG. 6 is a schematic circuit diagram of the amplifier Amp of the LDO 500 of FIG. 5, which is similar to the Amp_a shown in FIG. 4. The amplifier Amp includes the first amplifier transistor p1, the second amplifier transistor n1, the third amplifier transistor n2, the first current source $i_b$, the second current source $i_a$, and the diode D1, all connected as described with reference to FIG. 4. The amplifier Amp however includes two additional transistors, namely a fourth amplifier transistor n3 and a fifth amplifier transistor p2. A gate terminal of the fourth amplifier transistor n3 is coupled to the feedback circuit 308 for receiving the feedback voltage $v_{fb}$. A source terminal of the fourth amplifier transistor n3 is coupled to the source terminals of the second and third amplifier transistors n1 and n2, and a drain of the fourth amplifier transistor n3 is connected to a drain of the fifth amplifier transistor p2. A gate terminal of the fifth amplifier transistor p2 is coupled to the gate terminal of the first amplifier transistor p1, and a source terminal of the fifth amplifier transistor p2 is coupled to the source terminal of the first amplifier transistors p1 and receives the voltage output by the switch circuit 206. A node between the drain terminal of the fourth and fifth amplifier transistors p2 and n3 is coupled to the gate terminal of the LDO output transistor $N_b$ (see FIG. 5) and provides the gate control signal Gate_b thereto. In this embodiment, the initiation circuit and the LDO unit are integrated together, and share the first and second amplifier transistors p1 and n2, which saves power and device area.

Figure 7:
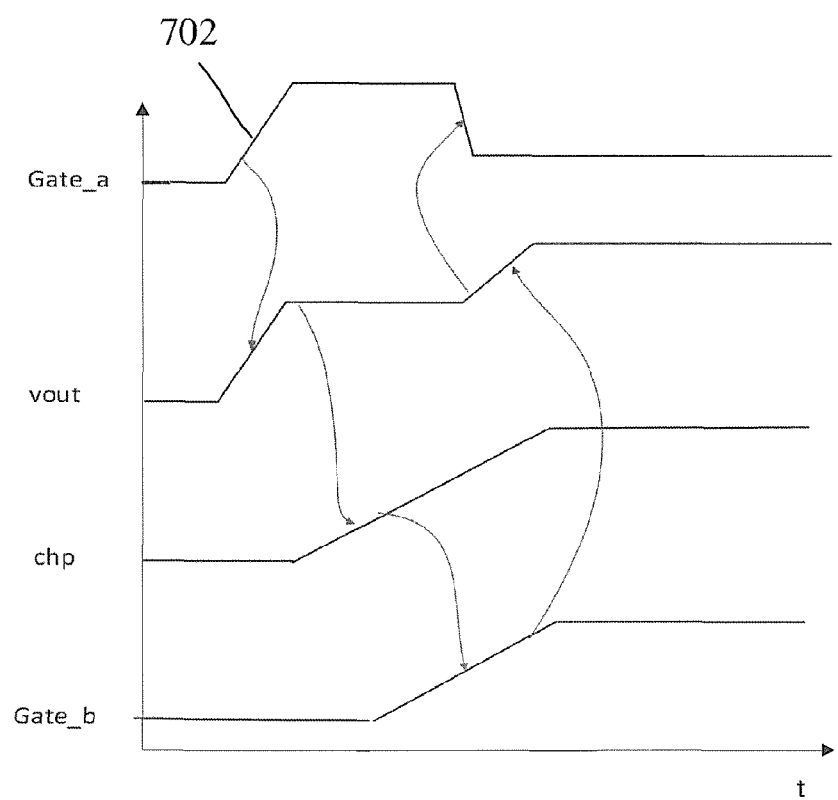
FIG. 7 is a timing diagram of signals of the LDOs of FIGS. 3 and 5.

FIG. 7 shows a timing diagram of the gate control signals Gate_a, Gate_b, the signal $v_{out}$ at the voltage output terminal 216, and a signal chp provided at the output terminal 236 of the charge pump circuit 210. The operation of the LDO 200 of FIG. 3 or the LDO 500 of FIG. 5 will be described with reference to FIG. 7.

As shown in FIG. 7, during the start-up interval 702, the clamp circuit 214 drives the first current source $i_b$ to output a signal with a voltage equal to the first input voltage $V_{in}$. The signal provided by the first current source $i_b$ boosts the gate voltage of the output transistor $N_a$, which in turn drives the charge pump circuit 210. The amplifier Amp_a and the reference voltage $V_{ref\_a}$ are used to regulate the gate control signal Gate_a so that the gate control signal is stable. The output of the charge pump circuit 210 chp turns on the transistor $M_b$. The LDO unit 208 starts to operate under the input voltage $V_{dd\_int}$, and the output voltage $v_{out}$ is boosted accordingly, which drives the charge pump circuit 210 to operate in a normal mode. Normal mode means the charge pump circuit 210 is able to operate per the output of the LDO unit 208 without being boosted by the initiation circuit 212. The feedback voltage $V_{fb}$ of the feedback circuit 308 stabilizes the operation of the LDO unit 208, by the gate control signal Gate_b of the LDO output transistor $N_b$. When the LDO unit 208 operates in a normal mode under the control of the LDO amplifier Amp_b and the LDO output transistor $N_b$, the gate voltage of the output transistor $N_a$ of the initiation circuit 212 is turned off by the amplifier Amp_a. In embodiments of the invention, the reference voltage $V_{ref\_b}$ is higher than the reference voltage $V_{ref\_a}$, and the second switch transistor $M_b$ has a lower threshold voltage than the first switch transistor $M_a$.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are intended merely to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

The invention claimed is:

1. A low drop-out voltage regulator (LDO) for providing a regulated output voltage, the LDO comprising:
    an LDO unit having an input terminal and an output terminal for providing the regulated output voltage;
    a switch circuit coupled between a voltage input terminal of the LDO and the input terminal of the LDO unit, wherein the switch circuit provides an input voltage to the LDO unit;
    a charge pump circuit having an input terminal coupled to the output terminal of the LDO unit and an output terminal coupled to a control terminal of the switch circuit, wherein the charge pump circuit receives the regulated output voltage and provides a switch control signal to the switch circuit; and
    an initiation circuit having an input terminal that receives the input voltage and an output terminal coupled to the input terminal of the charge pump circuit, wherein the initiation circuit generates an initiation voltage that is greater than the regulated output voltage to drive the charge pump circuit when the regulated output voltage is not large enough to drive the charge pump circuit.

2. The LDO of claim 1, wherein the LDO unit comprises:
    an LDO amplifier having a first input terminal coupled to a reference voltage, a second input terminal and an output terminal;
    an LDO output transistor having a control terminal coupled to the output terminal of the LDO amplifier, a first current electrode coupled to the switch circuit for receiving the input voltage, and a second current electrode that provides the regulated output voltage; and
    a feedback circuit coupled between the second current electrode of the LDO output transistor and ground, wherein the feedback circuit provides a feedback voltage to the second input terminal of the LDO amplifier.

3. The LDO of claim 2, wherein the LDO output transistor is an NMOS transistor.

4. The LDO of claim 1, wherein the initiation circuit comprises:
    an amplifier having a first input terminal coupled to a reference voltage, a second input terminal, and an output terminal;
    a first output transistor having a control terminal coupled to the output terminal of the initiation amplifier, a first current electrode coupled to the switch circuit for receiving the input voltage, and a second current electrode coupled to the input terminal of the charge pump circuit; and
    a feedback circuit coupled between the second current electrode of the first output transistor and ground, wherein the feedback circuit provides a feedback voltage to the second input terminal of the amplifier.

5. The LDO of claim 4, wherein the amplifier comprises:
    a first amplifier transistor having a source terminal coupled to the switch circuit for receiving the input voltage, a gate terminal, and a drain terminal, wherein the gate and drain terminals of the first amplifier transistor are coupled together;

a second amplifier transistor having a gate terminal coupled to the reference voltage, a drain terminal coupled to the drain terminal of the first amplifier transistor, and a source terminal;

a third amplifier transistor having a gate terminal coupled to the feedback circuit for receiving the feedback voltage, a source terminal coupled to the source terminal of the second amplifier transistor, and a drain terminal;

a first current source coupled between the voltage input terminal of the LDO and the control terminal of the first output transistor;

a diode coupled between the first current source and the drain terminal of the third amplifier transistor; and a second current source coupled between the source terminals of the second and third amplifier transistors and ground.

6. The LDO of claim 5, wherein the first amplifier transistor is a PMOS transistor, and the second and third amplifier transistors are NMOS transistors.

7. The LDO of claim 5, wherein the LDO unit comprises:

a fourth amplifier transistor having a gate terminal coupled to the feedback circuit for receiving the feedback voltage, a source terminal coupled to the source terminals of the second and third amplifier transistors, and a drain terminal;

a fifth amplifier transistor having a gate terminal coupled to the gate terminal of the first amplifier transistor, a source terminal coupled to the source terminal of the first amplifier transistor, and a drain terminal coupled to the drain terminal of the fourth amplifier transistor; and a second output transistor having a control terminal coupled to a node between the drain terminals of the fourth and fifth amplifier transistors, a first current electrode coupled to the switch circuit for receiving the input voltage, and a second current electrode that provides the regulated output voltage.

8. The LDO of claim 7, wherein the fourth amplifier transistor is an NMOS transistor, and the fifth amplifier transistor is a PMOS transistor.

9. The LDO of claim 7, wherein the first and second output transistors are NMOS transistors.

10. The LDO of claim 4, wherein the feedback circuit comprises first and second series connected resistors, wherein the feedback voltage is provided at a node between the first and second resistors.

11. The LDO of claim 1, wherein the switch circuit comprises a first switch transistor having first and second current electrodes respectively coupled to the voltage input terminal and the input terminal of the LDO unit, and a gate terminal coupled to the output terminal of the charge pump circuit for receiving the switch control signal.

12. The LDO of claim 11, wherein the switch circuit further comprises a second switch transistor having a first current electrode coupled to the first current electrode of the first switch transistor, a second current electrode coupled to the second current electrode of the first switch transistor, and a gate terminal coupled to receive the input voltage.

13. The LDO of claim 12, wherein the first and second switch transistors are NMOS transistors.

14. The LDO of claim 12, wherein the second switch transistor has a lower threshold voltage than the first switch transistor.

15. The LDO of claim 12, further comprising a clamp circuit coupled to the LDO input terminal for receiving the input voltage and generating a clamped input voltage, wherein the gate terminal of the second switch transistor is connected to the LDO input terminal by way of the clamp circuit, and the initiation circuit is connected to the LDO input terminal by way of the clamp circuit.

16. A low drop-out voltage regulator (LDO) that receives an input voltage and provides a regulated output voltage, the LDO comprising:

a switch circuit that receives the input voltage and a supply voltage, and outputs a selected one of the input voltage and the supply voltage;

a LDO unit connected to the switch circuit that receives the selected voltage and generates the regulated output voltage;

a charge pump circuit having an input terminal connected to the LDO unit for receiving the regulated output voltage, and an output terminal coupled to the switch circuit for controlling the selection of the one of the input voltage and the supply voltage; and an initiation circuit coupled to the charge pump circuit, and configured to provide an auxiliary output voltage that is larger than the regulated output voltage to the charge pump circuit, wherein the auxiliary output voltage drives the charge pump circuit to turn on the switch circuit.

17. The LDO of claim 16, wherein the switch circuit comprises a transistor having a gate terminal coupled to the charge pump circuit, a drain terminal that receives the supply voltage, and a source terminal coupled to the LDO unit for providing the selected input voltage to the LDO unit.

18. The LDO of claim 16, wherein the LDO unit comprises:

a first transistor having a gate terminal coupled to receive a reference voltage, a source terminal coupled to ground, and a drain terminal;

a second transistor having a gate terminal coupled to receive a feedback voltage, a source terminal coupled to ground and a drain terminal; and an output transistor having a gate terminal coupled to the drain terminal of the second transistor, a drain terminal coupled to the switch circuit for receiving the input voltage, and a source terminal for providing the LDO output voltage;

wherein the first transistor, the second transistor, and the output transistor are NMOS transistors.

19. The LDO of claim 18, wherein the initiation circuit comprises:

a first transistor having a gate terminal coupled to receive a reference voltage, a source terminal coupled to ground, and a drain terminal;

a second transistor having a gate terminal coupled to receive a feedback voltage, a source terminal coupled to ground, and a drain terminal; and an output transistor having a gate terminal coupled to the drain terminal of the second transistor, a drain terminal coupled to the supply voltage, and a source terminal for providing the auxiliary output voltage;

wherein the first transistor, the second transistor, and the output transistor are NMOS transistors.

20. A method of starting a low drop-out voltage regulator (LDO), comprising:

turning on a first switch to provide an input voltage to an LDO circuit by way of the first switch;

generating a regulated output voltage by the LDO circuit in response to the input voltage;

supplying a charge pump circuit with the regulated output voltage;

boosting the LDO output voltage to generate an auxiliary voltage that is higher than the regulated output voltage; and supplying the charge pump circuit with the auxiliary voltage when the regulated output voltage is not large enough to drive the charge pump circuit.

* * * * *